(12) United States Patent
Poplack et al.

(10) Patent No.: US 11,366,950 B1
(45) Date of Patent: Jun. 21, 2022

(54) TILED DATAMESH ARCHITECTURE

(71) Applicant: CADENCE DESIGN SYSTEMS, INC., San Jose, CA (US)

(72) Inventors: Mitchell G. Poplack, San Jose, CA (US); Tarik Hanai Omar, Truckee, CA (US); TheHung Luu, Santa Clara, CA (US); Zaid Khan, San Jose, CA (US); Jerome Albert, Sunnyvale, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/148,941

(22) Filed: Jan. 14, 2021

(51) Int. Cl.
   *G06F 30/394* (2020.01)
   *G06F 111/04* (2020.01)
   *G06F 111/02* (2020.01)
   *G06F 119/12* (2020.01)

(52) U.S. Cl.
   CPC ........ *G06F 30/394* (2020.01); *G06F 2111/02* (2020.01); *G06F 2111/04* (2020.01); *G06F 2119/12* (2020.01)

(58) Field of Classification Search
   USPC ........................................................ 716/126
   See application file for complete search history.

(56) References Cited

U.S. PATENT DOCUMENTS

| | | | | |
|---|---|---|---|---|
| 2007/0150846 A1* | 6/2007 | Furnish | ................ | G06F 30/392 716/122 |
| 2008/0216038 A1* | 9/2008 | Bose | ................... | G06F 30/392 716/118 |
| 2009/0254874 A1* | 10/2009 | Bose | ...................... | G06F 30/39 716/113 |

* cited by examiner

*Primary Examiner* — Mohammed Alam
(74) *Attorney, Agent, or Firm* — Foley & Lardner LLP (57) ABSTRACT

Methods and systems herein can efficiently interconnect processors through a custom grid (a data mesh) utilizing upper metal layer routing in a semiconductor die design to minimize latency. A computer-implemented method of routing interconnects on a semiconductor die includes receiving a set of non-default routes and associated routing rules; identifying a set of critical signals for feedthrough on the set of non-default routes; generating a connectivity matrix including a set of resulting routes, the resulting routes routing the set of critical signals through the set of non-default routes; generating a timing analysis of the connectivity matrix based on a set of latency requirements; responsive to determining that the timing analysis is not compliant with the latency requirements, generating a set of routing constraints; and updating the associated routing rules to include the set of routing constraints.

16 Claims, 6 Drawing Sheets

TILED DATAMESH ARCHITECTURE

TECHNICAL FIELD

The present invention relates generally to the field of electronic circuits, and, more specifically, methods and systems for interconnecting processor clusters.

BACKGROUND

A semiconductor die (e.g., processor core) having a large number of integrated circuit components (e.g., subchips, processor clusters, tiles) requires many thousands of on-chip interconnects. During design of such devices for physical implementation or emulation, the routing must minimize latency between subchips and maximize throughput. Current circuit routing tools cannot efficiently route and analyze paths in a large aggregate circuit design including upwards of 30 subchips across a 750 square millimeter area, often taking many hours at a time to route a single die, and each die requires multiple iterations. In addition, such timing analyses may have to wait until later in the development process to occur at a top level of the semiconductor die (e.g., a chip level) instead of at a sub level of the semiconductor die (e.g., a subchip level), because the subchips may not be identical. As such, timing analysis of the semiconductor die usually does not occur until late in the design process when all of the many thousands of processors in a massive database must be analyzed at one time, requiring significant computing resources and time to complete. Any issues appearing at this stage may require significant re-design.

One way physical designers may cut down on routing and analysis time is by utilizing non-default routes (NDR) (e.g., a route that uses metal routing resources normally reserved for power and ground planes, and not for signal routing), which are typically much faster, and applying some strategy to assign critical net to these routes, such as by pre-routing certain signals. However, these types of routes are a limited resource, and must be used only when absolutely required. Conventional route synthesizers cannot accurately judge which signals should use NDR and which should not since a design contains hundreds of millions of signals, only a few tens of thousands of which should be eligible for NDR. Existing solutions have the synthesizer attempt to route the design and have circuit designers custom route or adjust the critical signals by hand.

SUMMARY

Disclosed herein are methods and systems that address the above issues and may provide a number of additional of alternative benefits as well. The embodiments described herein provide a new interconnect layout tool and corresponding structure for efficiently routing processor interconnects through a custom interconnect grid (e.g., a data mesh) utilizing NDR. The interconnect layout tool is a custom software tool configured with NDR routing rules (e.g., physical spacing, total number of available routes, buffering requirements, and the like), resource availability, and critical signals of interest to efficiently route these signals within those constraints. A server hosting the interconnect layout tool is configured to analyze the timing of the resulting routes and feedback new constraints to the software to resolve any remaining issues. The corresponding structure is a tiled architecture including a series of processor clusters (e.g., tiles) coupled together with memory to form individual tiles that are repeated throughout a semiconductor die and distributed in an abutment architecture. The tiles are then glued together within the abutment architecture. This tiled architecture ensures that all the equivalent blocks are the same and can thus be replicated with ease, and the design, implementation, and timing analyses can be performed on a level of the individual tiles before they are glued together on a single die.

The custom interconnect grid is composed of NDR on a semiconductor die generated through use of a set of routing rules, which will be used for feedthrough of critical signals. The feedthrough routes are routed vertically through along a series of available tracks. Signals output by a row of processors undergo horizontal rearrangement in the immediately adjacent horizontal slice (e.g., row of processors or memory tiles) to route the signals to the appropriate vertical feedthrough. The resulting custom interconnect grid is used to generate a connectivity matrix for deriving point-to-point distances using pin placement of each component included in the semiconductor design. The connectivity matrix undergoes a timing analysis to determine whether or not the design meets latency requirements. If latency requirements of the design are met, then routing is complete. If the latency requirements are not met, then a set of routing constraints that the present design violates is generated and added to the list of routing rules used to re-generate an updated connectivity matrix. This process occurs until the design meets the latency requirements set forth by the circuit designer.

In one embodiment, a computer-implemented method of routing interconnects on a semiconductor die comprises receiving, by a processor, a set of non-default routes and associated routing rules; identifying, by the processor, a set of critical signals for feedthrough on the set of non-default routes; generating, by the processor, a connectivity matrix including a set of resulting routes, the resulting routes routing the set of critical signals through the set of non-default routes; generating, by the processor, a timing analysis of the connectivity matrix based on a set of latency requirements; responsive to determining that the timing analysis is not compliant with the latency requirements, generating, by the processor, a set of routing constraints; and updating, by the processor, the associated routing rules to include the set of routing constraints.

In another embodiment, a system configured to route interconnects on a semiconductor die comprises a non-transitory computer readable medium storing instructions; and at least one processor configured to execute the instructions to: receive a set of non-default routes and associated routing rules; identify a set of critical signals for feedthrough on the set of non-default routes; generate a connectivity matrix including a set of resulting routes, the resulting routes routing the set of critical signals through the set of non-default routes; generate a timing analysis of the connectivity matrix based on a set of latency requirements; responsive to determining that the timing analysis is not compliant with the latency requirements, generate a set of routing constraints; and update the associated routing rules to include the set of routing constraints.

In yet another embodiment, a semiconductor die comprising a tiled data mesh comprises a plurality of adjacent semiconductor slices having a plurality of tiles comprising at least one processor, a multiplexer, and a memory; a plurality of NDR configured to route critical signals between the tiles, the plurality of NDR dispersed among metal layers of the semiconductor die; and a plurality of buffers placed along the NDR at a predetermined interval.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The embodiments herein provide an improved method and system for efficiently interconnecting processors through a custom grid (e.g., a data mesh) utilizing upper metal layer routing in a semiconductor die design to minimize latency. The custom interconnect grid is composed of NDR generated by a software tool through use of a set of routing rules. The NDR are used for feedthrough of critical signals identified by the software tool. The resulting custom interconnect grid is used to generate a connectivity matrix for deriving point-to-point distances using pin placement of each component included in the semiconductor die design. The connectivity matrix undergoes a timing analysis to determine whether or not the design meets latency requirements. If latency requirements of the design are met, then routing is complete. If the latency requirements are not met, then a set of routing constraints that the present design violates is generated and added to the list of routing rules used to re-generate an updated connectivity matrix. This process occurs until the design meets the latency requirements set forth by the circuit designer.

Figure 1:
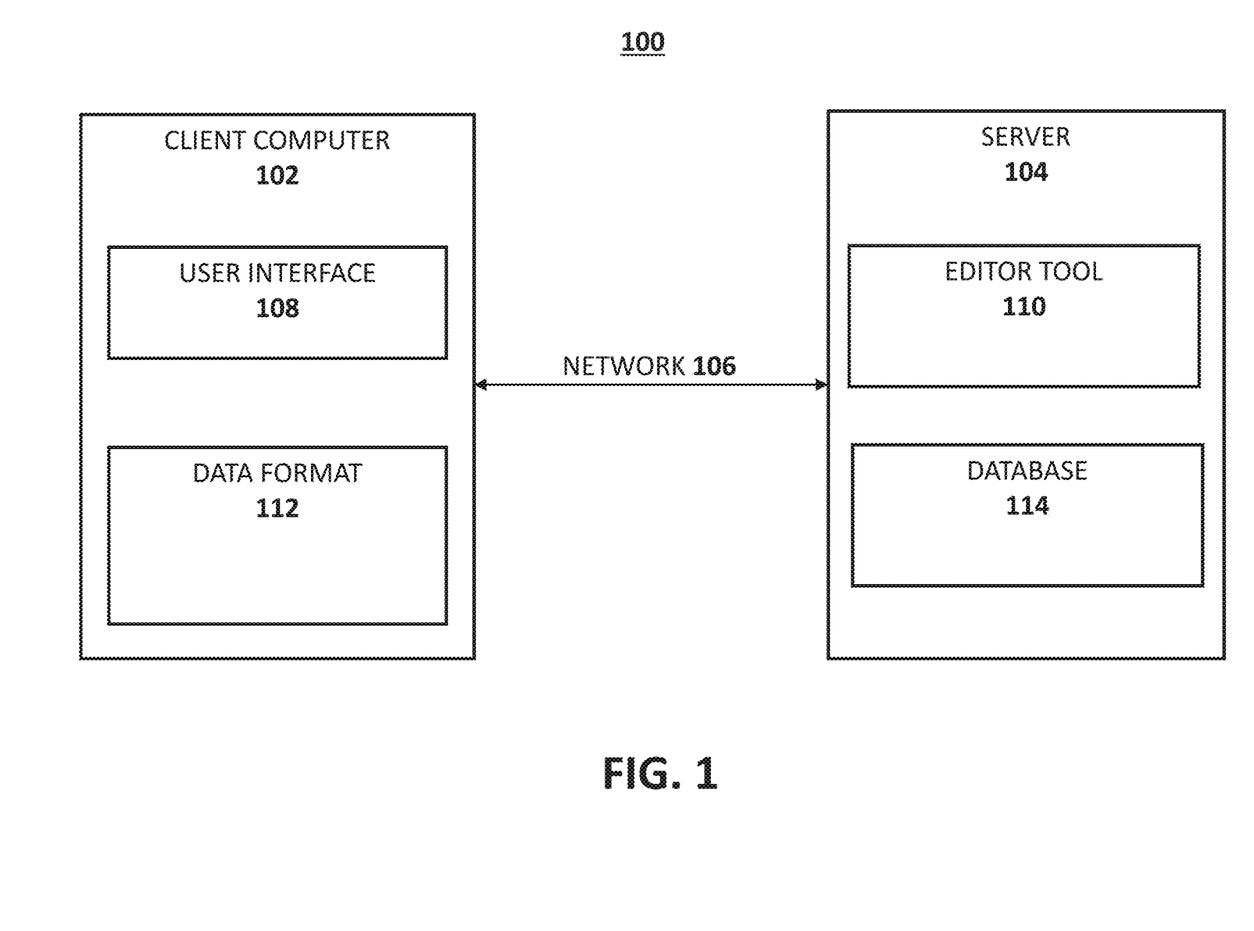
FIG. 1 illustrates various components for routing interconnects between individual components on a semiconductor die, according to an embodiment.

FIG. 1 illustrates various components 100 for routing interconnects between individual elements on a semiconductor die, according to an embodiment. The components include a client computer 102 and a server 104. The client computer 102 may communicate with the server 104 via a network 106. The network 106 refers to a medium that also connects various computing devices. Examples of the network 106 include, but are not limited to, LAN, WLAN, MAN, WAN, and the Internet, as well as cloud-based computing networks and platforms. The communication over the network 106 may be performed in accordance with various communication protocols such as Transmission Control Protocol and Internet Protocol (TCP/IP), User Datagram Protocol (UDP), and IEEE communication protocols.

The server 104 is a computing device capable of communication with the client computer 102. The server 104 is accessible to the client computer 102 via the network 106. The server 104 may be a computing device including having a processor, a memory and software programmed to perform one or more operations like those described herein. The server 104 may be a computing device connected to a remotely located server location via a cloud connection. The server 104 can host a database 114 containing design components and design specifications (e.g., routing rules) relating to formation of interconnects between processor clusters of a semiconductor die. The server 104 can receive instructions from the client computer 102 via a user interface 108 to facilitate editing interconnects in a design stored in database 114. For example, the server 104 may host a program configured to receive a semiconductor footprint (e.g., design) and generate a set of interconnects between each of the components included in the footprint.

The server 104 includes an interconnect editor tool 110 that comprises a collection of software tools capable of implementing editing functions such as adding, deleting, revising, or otherwise affecting the interconnects from within the user interface 108. The interconnect editor tool 110 has access to the database 114 such that the interconnect editor tool 110 can adjust interconnects in the design stored within database 114. The circuit designer of the client computer 102 uses the interconnect editor tool 110 to facilitate the editing of the interconnects. The user may interact with the interconnect editor tool 110 through a number of input devices, such as by inputting a selection as with a mouse or inputting a request as with a keyboard. The user may observe the response to the access request on an output device or display. The interconnect editor tool 110 may also run in an application window controlled by the user. The interconnect editor tool 110 can be a front-end program hosted by server 104 that receives a semiconductor design and divides the design into repeated identical tiles or subchips that are physically abutted.

Figure 2:
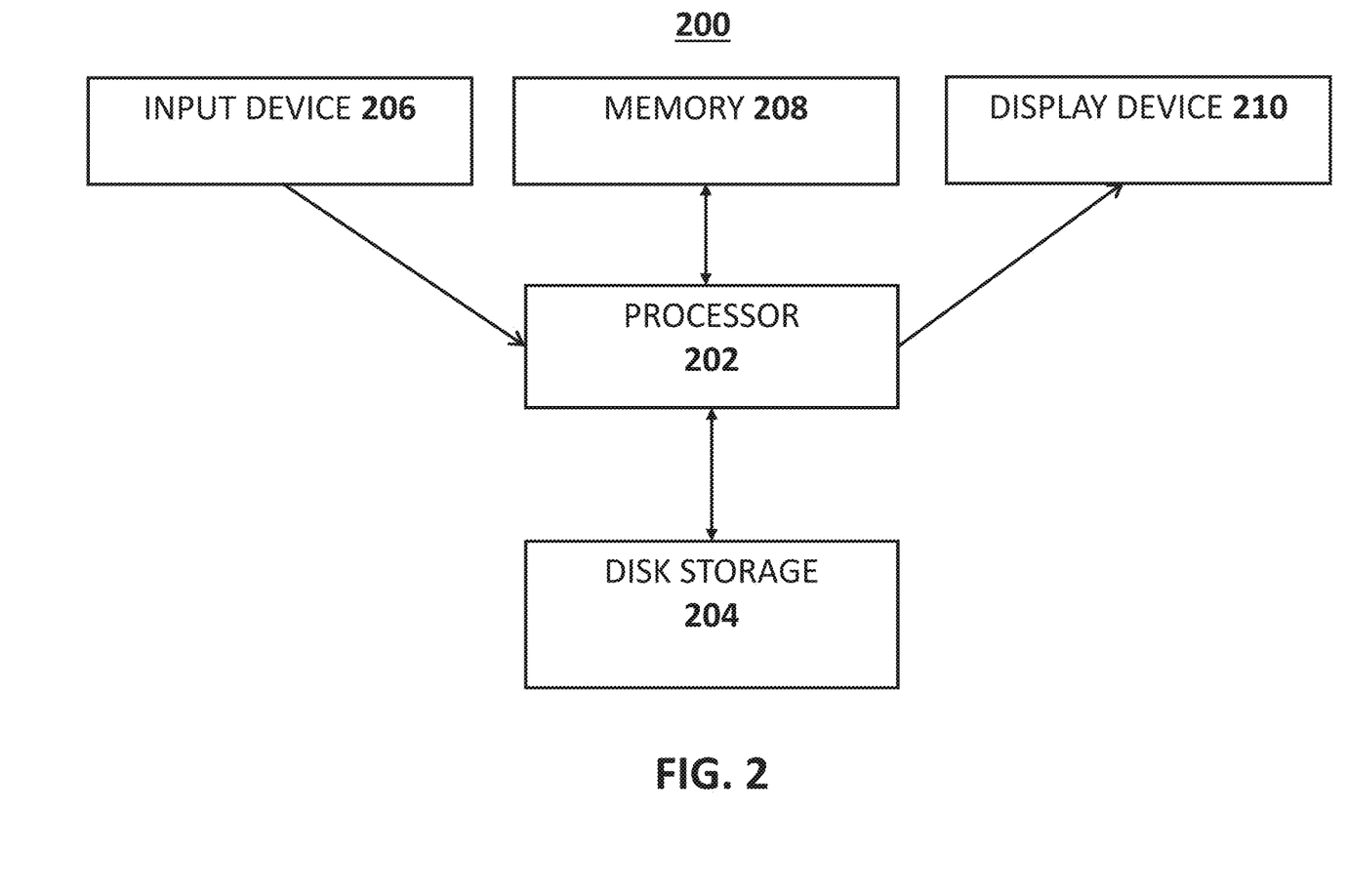
FIG. 2 is a block diagram depicting components of an interconnect routing system, according to an embodiment.

FIG. 2 is a block diagram depicting components of an interconnect routing system 200, according to an embodiment. The system 200 includes a processor 202, disk storage 204, an input device 206, a memory 208, and a display device 210. In one implementation, all the components of system 200 may be connected via interconnect bus. In another implementation, the processor 202 and the disk storage 206 may be connected via a local microprocessor bus, and the remaining units of the system 200 may be connected via one or more input/output buses.

The processor 202 utilizes processing system to control the operations of the system 200. The processor 202 may include a single processor or a plurality of processors for configuring the system 200 as a multi-processor system. The processor 202 includes suitable logic, circuitry, and interfaces that are operable to execute one or more instructions to perform predetermined operations/tasks. The processor 202 can be realized through a number of processor technologies known in the art. Examples of the processor 202 include, but are not limited to, an x86 processor, an ARM processor, a Reduced Instruction Set Computing (RISC)

processor, an Application-Specific Integrated Circuit (ASIC) processor, or a Complex Instruction Set Computing (CISC) processor. The processor 202 can perform the functions of a software tool such as interconnect editor tool 110 described with reference to FIG. 1.

The disk storage 204 is a non-volatile storage device for storing electronic circuit layouts and instructions, to be used by the processor 202. The disk storage 204 is implemented with a magnetic disk drive, an optical disk drive, a solid state device, or an attachment to network storage. The disk storage 204 may comprise one or more memory devices to facilitate storage and manipulation of program code, set of instructions, tasks, data, PDKs, and the like. Some of the commonly known disk storage 204 implementations include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. Further, the disk storage 204 includes the one or more instructions that are executable by the processor(s) of the processor 202 to perform specific operations. The one or more instructions stored in the disk storage 204 can enable the processor 202 of the system 200 to perform the predetermined operations/tasks. The support circuits for the processor include cache, power supplies, clock circuits, data registers, I/O interfaces, and the like. The I/O interface may be directly coupled to the disk storage 204 or coupled to the processor 202.

The input device 206 may be a keyboard, mouse, pointer, or other input generating device to facilitate input of control instructions by the semiconductor die designer to the processor 202. In one embodiment, the input device 206 provides a portion of the user interface for the system 200, and may include an alphanumeric keypad for inputting alphanumeric and other key information along with a cursor control device such as a mouse, a track pad or stylus.

The memory 208 of the system 200 stores the software to load it to the disk storage 204. The memory 208 of the system 200 may also store instructions to be used by processor 202 to allow the electronic circuit designer access to the semiconductor die for viewing, editing, or maybe both of chips and interconnects. The display unit 210 of the system 200 may include a cathode ray tube (CRT) display, liquid crystal display (LCD), plasma, or active matrix organic light emitting diode display. In an embodiment, a graphics subsystem may receive textual and graphical information, and processes the information for output to the display unit 210. In one embodiment, the semiconductor die design and interconnects may be accessed by the designer by way of a graphical user interface or editor visualized by the display unit 210. The display unit 210 may also visualize a graphical user interface or the editor having a design mode and an edit mode to enable generation and editing of interconnects in custom semiconductor die designs.

Figure 3:
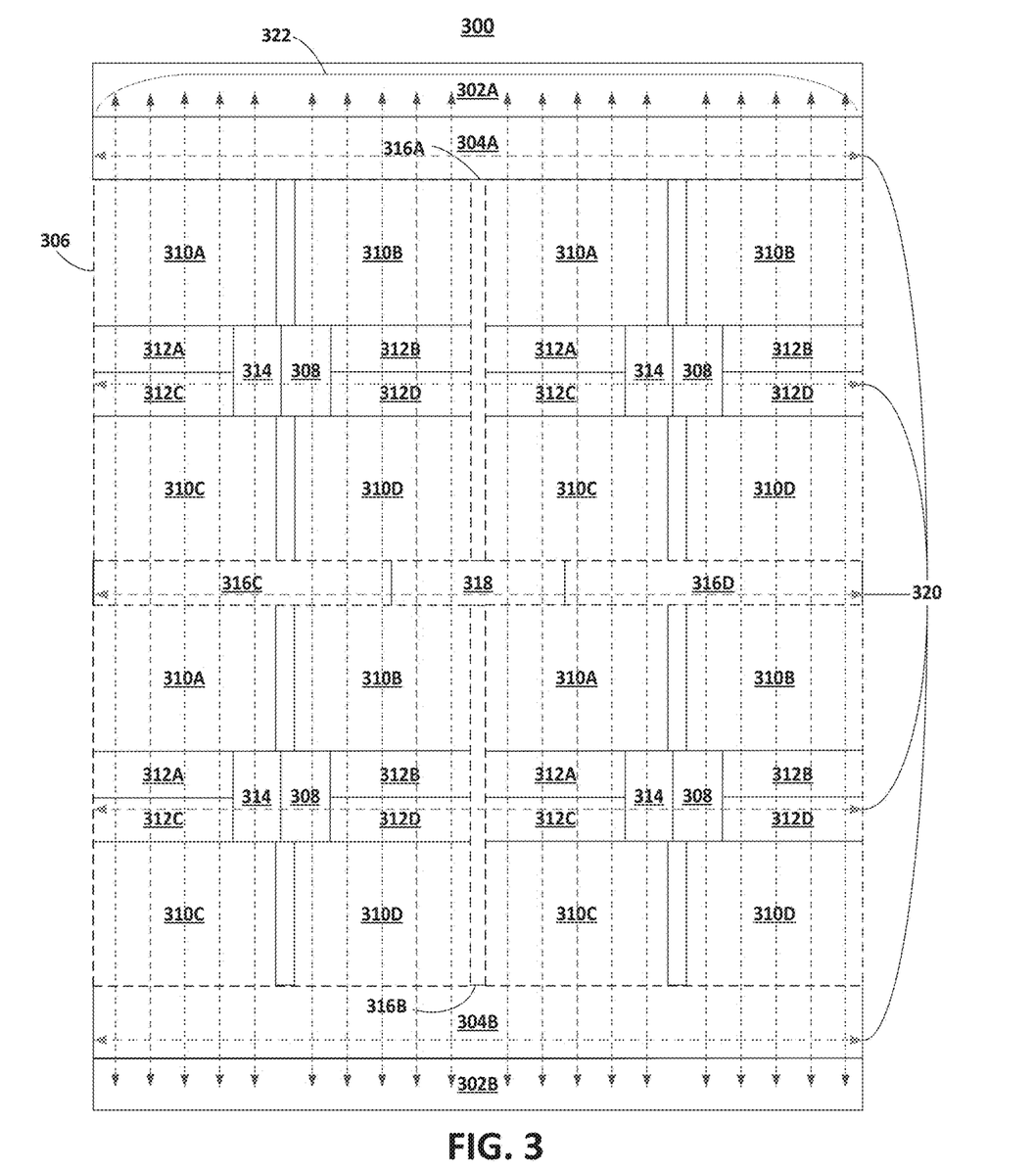
FIG. 3 is a block diagram depicting an example semiconductor die for optimal interconnect routing, according to an embodiment.

FIG. 3 is a block diagram depicting an example semiconductor die 300 for optimal interconnect routing. Semiconductor die 300 includes a north-end Serializer/Deserializer (SerDes) 302A for communication with a first set of digital devices, a south-end SerDes 302B for communication with a second set of digital devices, a north-end multiplexer 304A for receiving or transmitting a digital signal to or from the first set of digital devices, and a south-end multiplexer 304B for receiving or transmitting a digital signal to or from the second set of digital devices. Semiconductor die 300 further includes multiple subchips (e.g., tiles) 306 dispersed between a series of communication channels. The subchips 306 are processor clusters such as P2K processor clusters, which are composed of a multiplexer 308 in communication with four smaller P512 processor clusters 310A, 310B, 310C, and 310D. Processor clusters 310A-D also can be routed through a series of memories 312A, 312B, 312C, and 312D, which may each include eight memory cells. Semiconductor die 300 further includes a series of channels: north channel 316A, south channel 316B, west channel 316C, and east channel 316D. In the center of semiconductor die 300 is a control block 318.

The north-end SerDes 302A and the south-end SerDes 302B are functional blocks commonly used in high speed communications to compensate for limited input/output, and convert data between serial data and parallel interfaces in each direction. The north-end SerDes 302A has multiple inputs used as a parallel interface for receiving and serializing parallel signals into a serial signal, and multiple outputs used as a second parallel interface for deserializing and outputting parallel signals. North-end SerDes 302A interfaces with the north-end multiplexer 304A which multiplexes (e.g., selects between) the parallel signals for output into a single line (e.g., trace). The north-end multiplexer 304A may be split into multiple multiplexers such that signals can be both output from and input to the north-end SerDes 302A. The south-end SerDes 302B and south-end multiplexer 304B operate nearly identically to the north-end devices. A footprint of semiconductor die 300 (not shown) includes pin placement for the north-end SerDes 302A and multiplexer 304A and the south-end SerDes 302A and multiplexer 304B, such that the overall pin locations for each chip on semiconductor die 300 are known. When accessing a design for semiconductor die 300, information such as pin placement may be stored in a database or disk storage such as that described with reference to FIG. 1 and FIG. 2.

Each subchip 306 has a symmetrical structure, in which two processor clusters, for example P512 processor clusters 310A and 310B are respectively connected to memories 312A and 312B and to multiplexer 308 and trace 314 on an upper-half of subchip 306. This is mirrored in a lower-half of subchip 306, in which the P512 processor clusters 310C and 310D are respectively connected to the memories 312C and 312D and to the multiplexer 308 and the trace 314. Additionally, the structure of each subchip 306 is such that each of the individual components are disposed so as to abut each other to maximize die space. The footprint of semiconductor die 300 (not shown) includes pin placement for the subchips 306. To maintain the symmetrical structure of the subchips 306 for ease of interconnect routing and analysis, each of the subchips 306 has a same pinout such that the pin placement throughout the semiconductor die 300 as a result of the subchips 306 is spatially symmetrical.

The multiplexer 308 is connected to all four P512 processor clusters 310A-D of a given subchip 306 via the memories 312A-D. The multiplexer 308 can receive and distribute signals using trace 314. For example, a signal to be processed by subchip 306 at processor cluster 310A is routed to trace 314, and it is multiplexed by multiplexer 308 to output the signal to the correct destination processor of the attached P512 processors 310B-D.

Semiconductor die 300 has a hierarchical structure having a top level, in which the subchips 306 exist as black boxes having a number of inputs and outputs, and a sub level including the multiplexer 308, the P512 processor clusters 310A-D, the memories 312A-D, and the trace 314. In some embodiments, each subchip 306 has its own associated sub level. In alternative embodiments, the sub level consists of a row of P512 processor clusters 310A-B or 310C-D and their corresponding memory. The multiplexer 308 acts as the liaison between P512 processor clusters 310A-D and the other multiplexers 308, thereby nearly eliminating the need for intra-subchip interconnects (e.g., connections within the subchips 306). However, at least a portion of the memories 312A-D are connected to feedthroughs for inter-subchip use, such as signals originating from a first subchip 306 having a destination outside the first subchip 306, signals originating from a second subchip 306 having a destination of a third subchip 306, or signals originating from a second or third subchip 306 having a destination of the first subchip 306.

The inter-subchip interconnects, which traditionally have been pushed through at the top level, are now routed as feedthrough signals that are handled on the sub level of the hierarchy. These feedthrough signals make up a custom interconnect grid (e.g., a data mesh) utilizing non-default routes (NDR) that are generated specifically for critical signals so that critical signals need not be output to shared resources where a risk of unpredictable timing during a top-level routing phase exists. The interconnect layout tool is a custom software tool configured with NDR routing rules (e.g., physical spacing, total number of available routes, buffering requirements, and the like), resource availability, and critical signals of interest to efficiently route these signals within those constraints. A server hosting the interconnect layout tool is configured to analyze the timing of the resulting routes and feedback new constraints to the software to resolve any remaining issues.

The semiconductor die 300 is arranged in series of horizontal slices, represented by horizontal lines 320. Starting at the north-end of the semiconductor die 300, a first horizontal slice includes the north-end multiplexer 304A, a second horizontal slice includes the memories 312A-D of the upper subchips 306, a third horizontal slice encompasses the west channel 316C and the east channel 316D, a fourth horizontal slice includes the memories 312A-D of the lower subchips 306, and a fifth horizontal slice includes the south-end multiplexer 304B. A series of vertical tracks, represented by vertical lines 322, span the length of semiconductor die 300. The vertical tracks are used for any number of critical signals, which reach the vertical tracks through horizontal rearrangement within the horizontal slices 320. The horizontal rearrangement of the critical signals occurs through rearrangement of horizontal feedthrough using horizontal NDR tracks (not shown) in processor-adjacent slices of the semiconductor die 300. For example, a signal may be output by P512 processor cluster 310C of the upper-left subchip 306 of the semiconductor die 300 and have a destination of north-end multiplexer 304A. In order to reach north-end multiplexer 304A, route connecting to the correct output pin of the P512 processor cluster 310C is horizontally rearranged in the immediately adjacent horizontal slice, which in this case, is the second horizontal slice including memories 312A-D, to reach a vertical track connected to the north-end multiplexer 304A. The vertical tracks following vertical feedthrough NDR remain constant and the horizontal tracks are confined to particular regions of the semiconductor die 300. These horizontal tracks also utilize NDR and are a part of the data mesh.

The north channel 316A, the south channel 316B, the west channel 316C, and the east channel 316D are allocated for feedthrough traces; no processors are placed in these spaces on the semiconductor die 300. The north channel 316A and the south channel 316B run vertically along the center of the semiconductor die 300, and are allocated for potential vertical feedthrough NDR 322. The west channel 316C and the east channel 316D run horizontally along the center of the semiconductor die 300, and are allocated for both potential vertical and horizontal feedthroughs NDR 320. These feedthrough traces are routed on select upper metal layers to achieve low latency in the semiconductor die 300. In addition, lower metal layers are selectively used to reduce congestion of feedthrough NDR 320 and 322; these routes are doubled in size to reduce resistance, and therefore have low latency. A common channel in which the trace 314 and the multiplexer 308 are disposed exists between horizontally adjacent P512 processor clusters 310A-B and 310C-D through which no feedthroughs can be routed. An example signal may be routed through the channels as follows, starting in the upper left corner of the semiconductor die 300. A signal whose destination is north-end SerDes 302A and whose origin is bottom-right subchip 306 may be routed horizontally in east channel 316D to a vertical feedthrough track connecting east channel 316D directly to north-end SerDes 302A.

Control block 318 is a control circuit for centralized control which is needed within the semiconductor die 300. For example, one function of the control block 318 is to receive signals from outside the semiconductor die 300 for the purpose of synchronizing execution across multiple chips. In some embodiments, control block 318 acts as a controller for enabling the clusters of processors included in subchips 306 and all multiplexers included in the semiconductor die 300 according to control signals driven by the control block 318.

Figure 4:
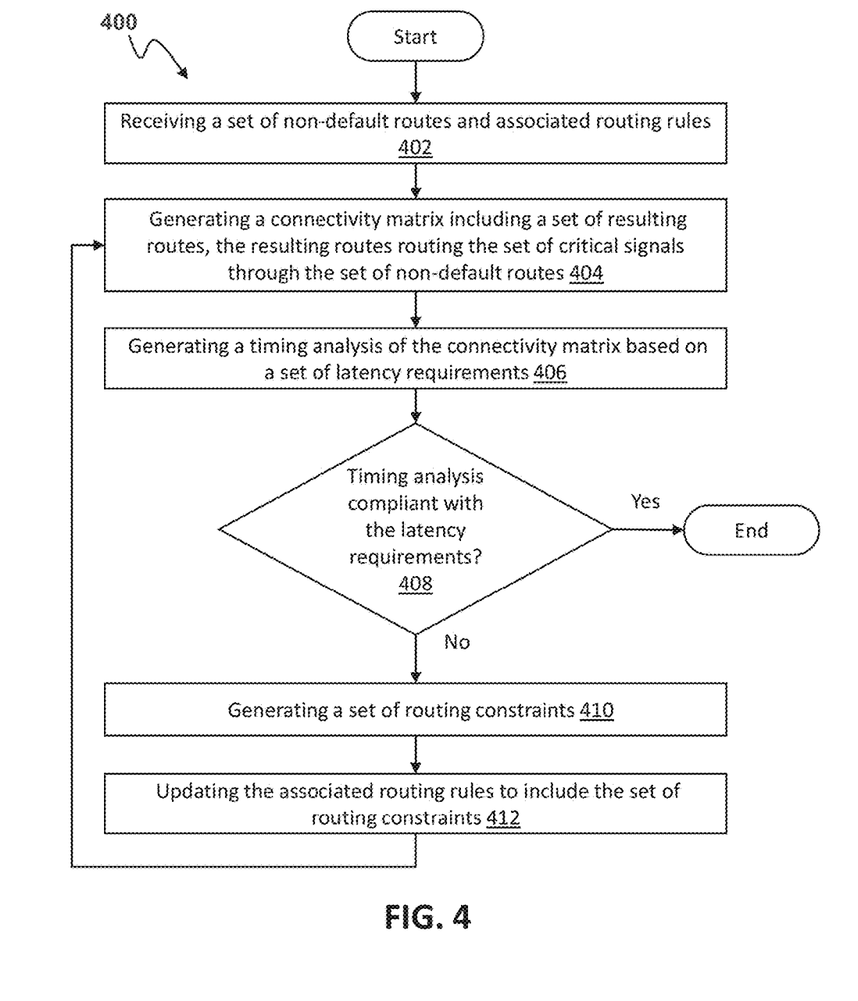
FIG. 4 is a flow chart depicting a method for routing feedthrough interconnects in semiconductor die, according to an embodiment.

FIG. 4 is a flow chart depicting a method 400 for routing feedthrough interconnects in a semiconductor die, such as semiconductor die 300 described with reference to FIG. 3. Method 400 may be implemented by a processor 202 (such as that described with reference to FIG. 2) executing a program for hosting a software tool a software tool such as interconnect editor tool 110 described with reference to FIG. 1. The method 400 may be performed on the semiconductor die in a hierarchical manner to route both top level and sub level interconnects. For ease of description, only the top level will be described.

The method 400 begins with a step 402, in which a set of non-default routes (NDR) and associated routing rules are received by the processor. The NDR consist of a series of vertical and horizontal routes available on the semiconductor die, and may exist in different metal layers of the semiconductor die. For the routes located in lower metal layers, the NDR are larger to account for the higher resistance experience by lower-layer routes. The NDR are used for routing critical signals, which may be identified by the software tool as part of step 402, or may be identified prior to execution of method 400 and stored in a database such as that described with reference to FIG. 1. The software tool is spatially aware; that is, the software tool defines available NDR in terms of spatial coordinates such as nanometers horizontally or vertically spaced from a designated corner of the semiconductor die, typically bottom left corner. The routing rules include rules such as physical spacing, total number of available routes, buffering requirements, and the like that any interconnects utilizing NDR must abide by, and which the software tool uses to analyze the efficacy of the interconnects. The routing rules further include the stipulation that signals output by a processor be horizontally rearranged in the immediately adjacent semiconductor slice to be routed to feedthrough tracks running vertically along the semiconductor die.

The method 400 continues with a step 404 in which a connectivity matrix including a set of resulting routes is generated. The resulting routes are feedthrough that route the set of critical signals through the NDR received in step 402, and are defined in terms of their spatial coordinates as described above in step 402. The connectivity matrix is generated by the software tool to interconnect all feedthrough routes, and is a matrix mapping outputs to their corresponding inputs based on pinouts. Once generated, the software tool appends, for each pin on the semiconductor die, the physical pin placement to the connectivity matrix as part of step 404. By matching the physical pin placement to the pins included in the connectivity matrix, the software tool can derive point-to-point distances within one segment of the matrix to determine custom locations for insertion of buffers and flip-flops along the route. In some examples, the buffers are placed every 500 microns with a deviation of ±50. The connectivity matrix is appended to include the instances of the anchor buffers and anchor flip-flops in the associated segment and their physical coordinates to form a data mesh. After step 404, each resulting route can include a combination of vertical routing, horizontal routing, buffers, and flip-flops.

The method 400 continues with a step 406 in which a timing analysis of the connectivity matrix based on a set of latency requirements is generated. The set of latency requirements are stored in a database accessible by the software tool, as described with reference to FIG. 1. The software tool can retrieve the latency requirements and perform the timing analysis of the connectivity matrix generated in step 404. The timing analysis can include delay per stage analyses in which the delay per stage is measured for each hard macro to determine whether per stage delay exceeds the latency requirements. This is used as a metric to measure the likelihood that the fully assembled semiconductor die will meet latency requirements. For example, if each of the delay per stage of the hard macros meets the latency requirements, it can be assumed that the fully assembled semiconductor die will meet those requirements as well. Additionally, the timing analysis can include top-level analysis of the fully assembled semiconductor die. This may be the only timing analysis or it may be performed in addition to the delay per stage analyses, such that if the semiconductor die does not meet the latency requirements but each of the hard macros does, the circuit designer can address the problem prior to manufacture.

The method 400 continues with a step 408 in which it is determined whether or not the timing analysis is compliant with the latency requirements. The software tool compares the generated timing analysis to that of the latency requirements stored in the database accessible to the software tool. The software tool may compare the delay per stage of each of the hard macros to the latency requirements to pinpoint which portions of the circuit are or are not compliant. If the software tool determines that the timing analysis is compliant (e.g., yes in step 408), method 400 may terminate. If the software tool determines that the timing analysis is not compliant (e.g., no in step 408), method 400 proceeds to a step 410.

In step 410 of method 400, a set of routing constraints is generated based on the results of the timing analysis determining that at least a portion of the connectivity matrix is non-compliant with the latency requirements. Here, the software tool may identify which routes of the connectivity matrix are non-compliant from the identified hard macros which failed the timing analysis. Any routes connected to the hard macros having failed delay per stage timing analysis may be used to generate the set of routing constraints. For example, if a particular feedthrough route is too narrow and is causing significant delay, the routing constraint may require that the cross-sectional area of the particular feedthrough must be expanded in cross-sectional area to reduce resistance, additional buffers must be added along the route, or the route must be moved to another metal layer. During step 410, the software tool stores all generated routing constraints in a memory, such as that described with reference to FIG. 2.

The method 400 continues with a step 412, in which the routing rules are updated to include the set of routing constraints generated in step 410. For example, the routing constraints stored in the memory during step 410 can be stored in the database by the software tool as a routing rule to be used in subsequent iterations of the method 400. In doing so, the software tool can create additional rules to prevent the issue discovered in step 410, such as the too-narrow route causing delay, from occurring during subsequent routing syntheses. The method 400 may return to step 404 in order to use the updated routing rules to update the connectivity matrix to account for the newly added routing constraints. For example, when the routing constraint requiring the too-narrow route identified in step 410 to be expanded becomes a routing rule, that particular feedthrough will be routed according to the updated routing rules. As such, any failure in timing analysis will be caused by a different issue than the one addressed in the last iteration. The method 400 may iteratively perform steps 404-412 until a timing analysis compliant with the latency requirements is achieved, after which the method 400 may terminate. When performing a delay per stage analysis of the hard macros, the method 400 may be performed for each hard macro included in the semiconductor die until all hard macros are compliant.

Figure 5:
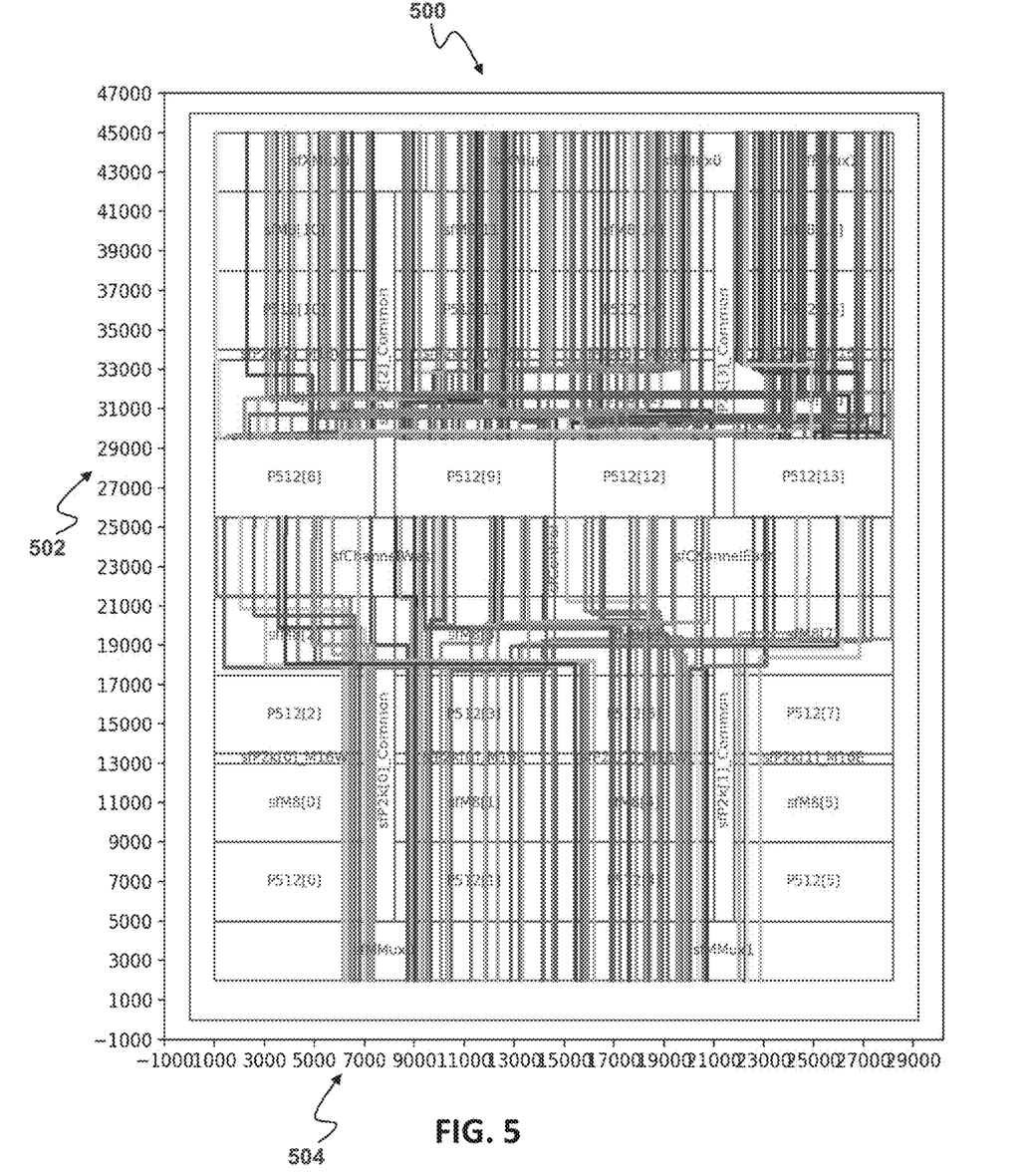
FIG. 5 is an illustrative example of a semiconductor die having feedthrough interconnects routed using the method of FIG. 4, according to an embodiment.

FIG. 5 is an illustrative example of a semiconductor die 500 having feedthrough interconnects routed according to the method of FIG. 4. The semiconductor 500 is another example of a semiconductor die utilizing a series of subchips, such as subchips 306 described with reference to FIG. 3. The semiconductor die 500 includes a row of processor clusters belonging to two subchips through which a series of feedthrough routes are connected on a sub level. The feedthrough routes are NDR that are routed vertically along a series of vertical feedthrough tracks and/or horizontally in semiconductor slices immediately adjacent to the origin semiconductor slice as described in detail with reference to FIG. 3. The semiconductor die 500 is produced as a result of a software tool (such as that described with reference to FIG. 1) executing a method substantially similar to that of method 400 of FIG. 4. A coordinate plane spatially defining the semiconductor 500 can be seen including a vertical axis 502 and a horizontal axis 504. Each feedthrough route is treated as a line having a specific width that is routed through the semiconductor die 500 along a set of coordinates determined by the software tool.

Figure 6A:
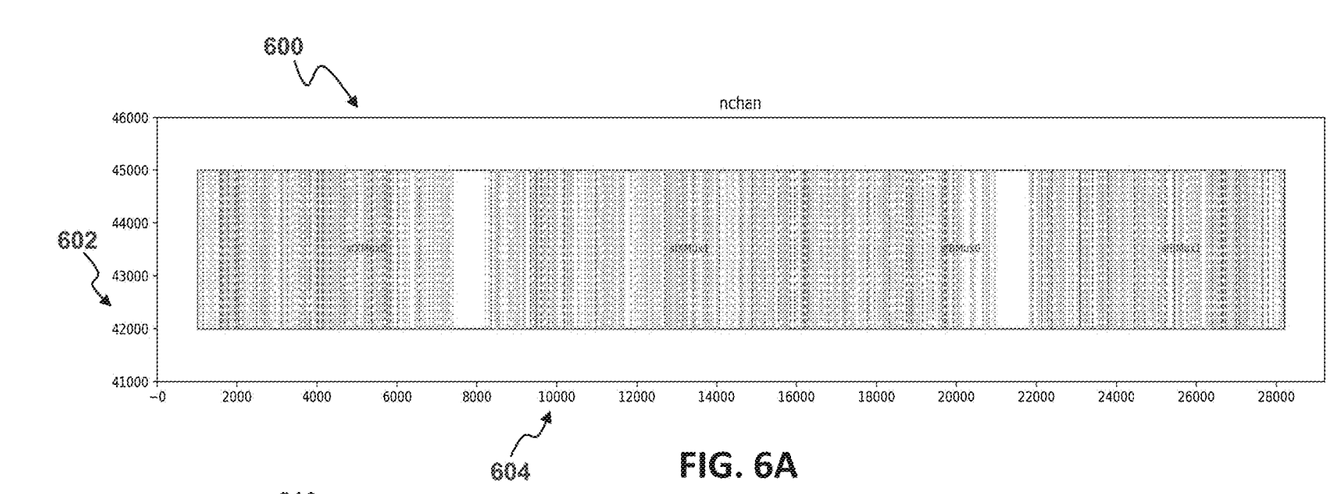
FIG. 6A and FIG. 6B are illustrative examples of vertical and horizontal feedthrough interconnects routed using the method of FIG. 4, according to an embodiment.
Figure 6B:
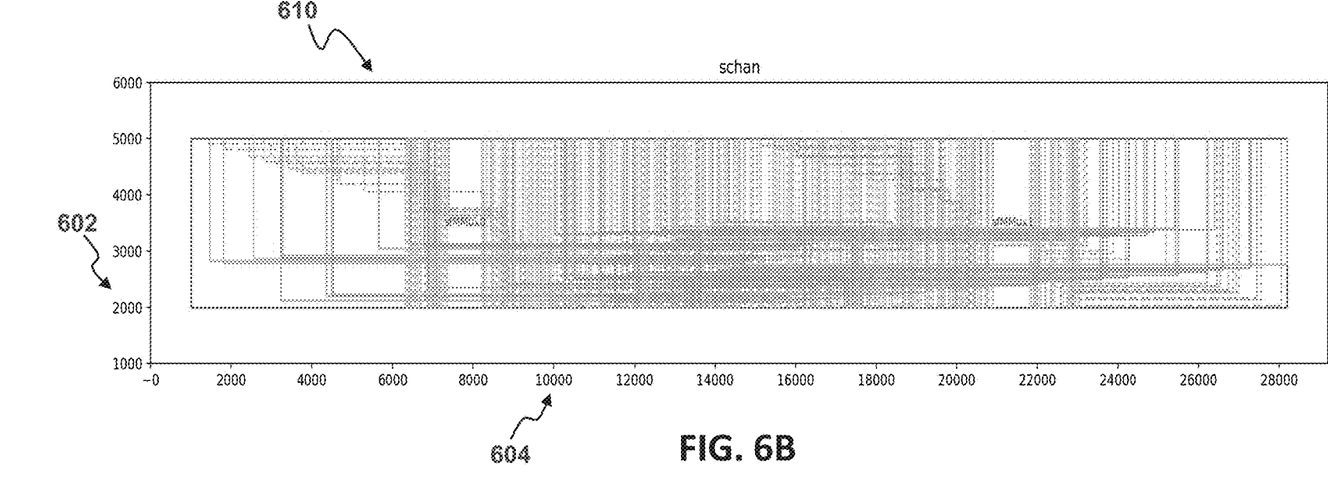

FIG. 6A and FIG. 6B are illustrative examples of vertical feedthrough interconnects in a north-end channel of multiplexers 600 and horizontal feedthrough interconnects in a south-end channel of multiplexers 650, the feedthrough interconnects having been routed according to the method of FIG. 4. The north-end channel of multiplexers 600 have feedthrough interconnects utilizing only vertical NDR. The south-end channel of multiplexers 650 have feedthrough interconnects utilizing both vertical and horizontal NDR. Each bank of multiplexers is spatially defined by a coordinate plane having a vertical axis 502 and a horizontal axis 504. Similar to semiconductor 500 of FIG. 5, each feedthrough route is treated as a line having a specific width that is routed through each bank of multiplexers along the coordinate plane. Lines that appear to overlap exist on different metal layers to preserve signal integrity.

Disclosed herein is a software tool, methodology, and corresponding architecture for efficiently utilizing NDR for critical signals in a semiconductor die design. The disclosed software tool, methodology, and corresponding architecture provides simplified top level convergence through separating the design into repeated subchips, by allowing for the design, implementation, and timing analyses to be performed on a level of the individual tiles before they are glued together on a single die. For example, this structure gives predictability to the software tool to perform timing analyses for each hard macro within a subchip or the hard macros as a group for determining delay per stage. The symmetry provided by the use of repeated subchips further allows for easy route generation by the software tool due to static pin placement. Even when additional subchips are added, the original pin placement is not altered and the original constraints still apply. In addition, timing analyses no longer need to be delayed until later in the semiconductor die design process, nor will a failure of any individual subchip cause significant design delays resulting from processing the massive databases needed to perform such analyses.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method of routing interconnects on a semiconductor die, the method comprising:
   receiving, by a processor, a set of non-default routes and associated routing rules;
   identifying, by the processor, a set of critical signals for feedthrough on the set of non-default routes;
   generating, by the processor, a connectivity matrix including a set of resulting routes, the resulting routes routing the set of critical signals through the set of non-default routes;
   generating, by the processor, a timing analysis of the connectivity matrix based on a set of latency requirements;
   responsive to determining that the timing analysis is not compliant with the latency requirements, generating, by the processor, a set of routing constraints; and
   updating, by the processor, the associated routing rules to include the set of routing constraints.

2. The method of claim 1, wherein the routing rules include physical spacing requirements, total number of available routes, and buffering requirements of the non-default routes.

3. The method of claim 1, wherein the critical signals are to be routed between two pins on a semiconductor die.

4. The method of claim 3, wherein generating the connectivity matrix including the set of resulting routes comprises:
   determining, by the processor, a point-to-point distance between the two pins based on the set of NDR;
   routing, by the processor, a resulting route along the point-to-point distance; and
   for each segment of the resulting route, inserting, by the processor, a buffer.

5. The method of claim 1, wherein the plurality of tiles are disposed adjacent to one another in an abutment architecture.

6. The method of claim 1, wherein generating the timing analysis comprises determining, by the processor, for each hard macro in a set of hard macros, whether the delay per stage of the hard macro is compliant with the latency requirements.

7. The method of claim 1, further comprising horizontally rearranging, by the processor, the critical signals output by an origin semiconductor slice in an immediately adjacent semiconductor slice to connect with a vertical NDR.

8. The method of claim 1, further comprising spatially distributing, by the processor, based on a coordinate system of the semiconductor die, the resulting routes among the available NDR.

9. A system configured to route interconnects on a semiconductor die, the system comprising:
   a non-transitory computer readable medium storing instructions;
   at least one processor configured to execute the instructions to:
      receive a set of non-default routes and associated routing rules;
      identify a set of critical signals for feedthrough on the set of non-default routes;
      generate a connectivity matrix including a set of resulting routes, the resulting routes routing the set of critical signals through the set of non-default routes;
      generate a timing analysis of the connectivity matrix based on a set of latency requirements;
      responsive to determining that the timing analysis is not compliant with the latency requirements, generate a set of routing constraints; and
      update the associated routing rules to include the set of routing constraints.

10. The system of claim 9, wherein the routing rules include physical spacing requirements, total number of available routes, and buffering requirements of the non-default routes.

11. The system of claim 9, wherein the critical signals are to be routed between two pins on a semiconductor die.

12. The system of claim 11, wherein the processor is further configured to:
   determine a point-to-point distance between the two pins based on the set of NDR;
   route a resulting route along the point-to-point distance; and
   for each segment of the resulting route, insert a buffer.

13. The system of claim 9, wherein the plurality of tiles are disposed adjacent to one another in an abutment architecture.

14. The system of claim 9, wherein the processor is configured to generate the timing analysis by determining, for each hard macro in a set of hard macros, whether the delay per stage of the hard macro is compliant with the latency requirements.

15. The system of claim 9, wherein the processor is further configured to horizontally rearrange the critical signals output by an origin semiconductor slice in an immediately adjacent semiconductor slice to connect with a vertical NDR.

16. The system of claim 9, wherein the processor is further configured to spatially distribute the resulting routes among the available NDR based on a coordinate system of the semiconductor die.

* * * * *